(12) United States Patent
Krumm et al.

(10) Patent No.: US 8,473,198 B2
(45) Date of Patent: Jun. 25, 2013

(54) ADDITIONAL CONTENT BASED ON INTENDED TRAVEL DESTINATION

(75) Inventors: John C. Krumm, Redmond, WA (US); Ruston Panabaker, Redmond, WA (US); Jeffrey D. Couckuyt, Bothell, WA (US); Ivan J. Tashev, Kirkland, WA (US); Michael Lewis Seltzer, Seattle, WA (US); Neil W. Black, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 11/957,188

(22) Filed: Dec. 14, 2007

(65) Prior Publication Data

US 2009/0157307 A1   Jun. 18, 2009

(51) Int. Cl.
  *G01C 21/00* (2006.01)
(52) U.S. Cl.
  USPC ............... 701/425; 701/410; 705/14
(58) Field of Classification Search
  USPC ................ 701/200, 201, 207, 213; 705/14.1, 705/14.3, 14.14, 14.4, 14.45
  See application file for complete search history.

(56) References Cited

U.S. PATENT DOCUMENTS

| | | | |
|---|---|---|---|
| 4,884,208 A | 11/1989 | Marinelli et al. | |
| 4,939,663 A | 7/1990 | Baird | |
| 5,187,667 A | 2/1993 | Short | |
| 5,422,813 A | 6/1995 | Schuchman et al. | |
| 5,504,482 A | 4/1996 | Schreder | |
| 5,629,854 A | 5/1997 | Schulte | |
| 5,648,768 A | 7/1997 | Bouve | |
| 5,774,073 A | 6/1998 | Maekawa et al. | |
| 5,938,720 A | 8/1999 | Tamai | |
| 5,987,381 A | 11/1999 | Oshizawa | |
| 6,038,444 A | 3/2000 | Schipper et al. | |
| 6,060,989 A | 5/2000 | Gehlot | |
| 6,119,065 A | 9/2000 | Shimada et al. | |
| 6,199,009 B1 | 3/2001 | Meis et al. | |
| 6,199,045 B1 | 3/2001 | Giniger | |
| 6,249,742 B1 | 6/2001 | Friederich et al. | |

(Continued)

FOREIGN PATENT DOCUMENTS

| | | |
|---|---|---|
| EP | 1519288 A2 | 3/2005 |
| EP | 1659368 A1 | 5/2006 |

(Continued)

OTHER PUBLICATIONS

Mapquest Business Solutions Advantage API™ http://cdn.mapquest.com/corpb2b/bsolutions-advantageapi-pdf-whitepaper.pdf. Last accessed Oct. 4, 2007, 22 pages.

(Continued)

*Primary Examiner* — Helal A Algahaim
(74) *Attorney, Agent, or Firm* — Shook, Hardy & Bacon L.L.P.

(57) ABSTRACT

When users travel to an intended destination, a plurality of information can be beneficial to assist their travel. If a person is traveling to a crowded event, then information can be provided such that congested traffic areas can be provided. There can be financial opportunities available in relation to providing information concerning an intended destination. An advertiser can pay money to have information played about the advertiser when it relates to the intended destination. Furthermore, a user can pay money for detailed data concerning an intended location, such as where cheapest parking is located.

14 Claims, 11 Drawing Sheets

U.S. PATENT DOCUMENTS

| | | |
|---|---|---|
| 6,253,980 B1 | 7/2001 | Murakami et al. |
| 6,317,686 B1 | 11/2001 | Ran |
| 6,321,158 B1 | 11/2001 | DeLorme et al. |
| 6,339,746 B1 | 1/2002 | Sugiyama et al. |
| 6,374,182 B2 | 4/2002 | Bechtolsheim et al. |
| 6,381,535 B1 | 4/2002 | Durocher et al. |
| 6,381,538 B1 | 4/2002 | Robinson et al. |
| 6,415,226 B1 | 7/2002 | Kozak |
| 6,470,267 B1 | 10/2002 | Nozaki |
| 6,510,379 B1 | 1/2003 | Hasegawa et al. |
| 6,526,350 B2 | 2/2003 | Sekiyama |
| 6,542,811 B2 | 4/2003 | Doi |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,636,145 B1 | 10/2003 | Murakami et al. |
| 6,640,187 B1 | 10/2003 | Chenault et al. |
| 6,687,608 B2 | 2/2004 | Sugimoto et al. |
| 6,697,730 B2 | 2/2004 | Dickerson |
| 6,711,474 B1 * | 3/2004 | Treyz et al. .................. 701/1 |
| 6,721,654 B2 * | 4/2004 | Akiyama ................ 701/209 |
| 6,778,903 B2 | 8/2004 | Robinson et al. |
| 6,785,607 B2 | 8/2004 | Watanabe et al. |
| 6,813,501 B2 | 11/2004 | Kinnunen et al. |
| 6,826,472 B1 | 11/2004 | Kamei et al. |
| 6,829,532 B2 | 12/2004 | Obradovich et al. |
| 6,847,889 B2 | 1/2005 | Park et al. |
| 6,865,482 B2 | 3/2005 | Hull |
| 6,871,137 B2 | 3/2005 | Scaer et al. |
| 6,898,517 B1 | 5/2005 | Froeberg |
| 6,952,559 B2 | 10/2005 | Bates et al. |
| 6,965,325 B2 | 11/2005 | Finnern |
| 6,993,326 B2 | 1/2006 | Link, II et al. |
| 7,016,307 B2 | 3/2006 | Vasudev et al. |
| 7,027,915 B2 | 4/2006 | Craine |
| 7,043,356 B2 | 5/2006 | Linn |
| 7,058,506 B2 | 6/2006 | Kawase et al. |
| 7,062,376 B2 | 6/2006 | Oesterling |
| 7,069,308 B2 | 6/2006 | Abrams |
| 7,076,409 B2 | 7/2006 | Agrawala et al. |
| 7,080,139 B1 | 7/2006 | Briggs et al. |
| 7,082,364 B2 | 7/2006 | Adamczyk |
| 7,092,819 B2 | 8/2006 | Odachi et al. |
| 7,103,368 B2 | 9/2006 | Teshima |
| 7,120,444 B2 | 10/2006 | Silvester |
| 7,149,625 B2 | 12/2006 | Mathews et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 * | 7/2007 | Yokota et al. ................ 701/202 |
| 7,245,925 B2 | 7/2007 | Zellner |
| 7,250,907 B2 | 7/2007 | Krumm et al. |
| 7,286,837 B2 | 10/2007 | Giniger et al. |
| 7,295,805 B2 | 11/2007 | Walker |
| 7,308,236 B2 | 12/2007 | Fukushima |
| 7,376,414 B2 | 5/2008 | Engstrom |
| 7,403,905 B2 | 7/2008 | Shioda et al. |
| 7,466,986 B2 | 12/2008 | Halcrow et al. |
| 7,496,484 B2 | 2/2009 | Agrawala et al. |
| 7,512,487 B1 | 3/2009 | Golding |
| 7,522,995 B2 | 4/2009 | Nortrup |
| 7,587,273 B2 | 9/2009 | Ohnishi et al. |
| 7,624,024 B2 | 11/2009 | Levis et al. |
| 7,627,414 B2 | 12/2009 | Goto et al. |
| 2001/0014849 A1 | 8/2001 | King et al. |
| 2001/0020211 A1 | 9/2001 | Takayama et al. |
| 2001/0025222 A1 | 9/2001 | Bechtolsheim et al. |
| 2001/0032121 A1 | 10/2001 | Le |
| 2001/0037271 A1 | 11/2001 | Kubota |
| 2001/0044321 A1 | 11/2001 | Ausems et al. |
| 2001/0044693 A1 | 11/2001 | Gotou et al. |
| 2001/0055165 A1 | 12/2001 | McCarthy |
| 2002/0004700 A1 | 1/2002 | Klein |
| 2002/0032035 A1 * | 3/2002 | Teshima ................ 455/456 |
| 2002/0055872 A1 * | 5/2002 | LaBrie et al. ................ 705/14 |
| 2002/0084917 A1 | 7/2002 | Hauptman |
| 2002/0091568 A1 | 7/2002 | Kraft et al. |
| 2002/0097193 A1 | 7/2002 | Powers |
| 2002/0107027 A1 | 8/2002 | O'Neil |
| 2002/0121981 A1 | 9/2002 | Munch |
| 2002/0124050 A1 | 9/2002 | Middeljans |
| 2002/0143464 A1 | 10/2002 | Blewitt |
| 2002/0169540 A1 | 11/2002 | Engstrom |
| 2002/0184091 A1 | 12/2002 | Pudar |
| 2003/0023371 A1 | 1/2003 | Stephens |
| 2003/0043045 A1 | 3/2003 | Yasushi |
| 2003/0093216 A1 | 5/2003 | Akiyama |
| 2003/0135304 A1 | 7/2003 | Sroub et al. |
| 2003/0158650 A1 | 8/2003 | Abe et al. |
| 2003/0182183 A1 | 9/2003 | Pribe |
| 2004/0076279 A1 | 4/2004 | Taschereau |
| 2004/0088392 A1 | 5/2004 | Barrett et al. |
| 2004/0117195 A1 | 6/2004 | Bodin |
| 2004/0117246 A1 * | 6/2004 | Applebaum .................. 705/14 |
| 2004/0143496 A1 | 7/2004 | Saenz |
| 2004/0158433 A1 | 8/2004 | Wimschneider et al. |
| 2004/0204848 A1 | 10/2004 | Matsuo et al. |
| 2004/0233045 A1 | 11/2004 | Mays |
| 2005/0085997 A1 | 4/2005 | Park |
| 2005/0125148 A1 | 6/2005 | Van Buer et al. |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0198287 A1 | 9/2005 | Sauve et al. |
| 2005/0216182 A1 | 9/2005 | Hussain et al. |
| 2005/0267651 A1 | 12/2005 | Arango |
| 2006/0041500 A1 | 2/2006 | Diana et al. |
| 2006/0053038 A1 | 3/2006 | Warren et al. |
| 2006/0058947 A1 | 3/2006 | Schalk |
| 2006/0074531 A1 | 4/2006 | Saarinen et al. |
| 2006/0095374 A1 | 5/2006 | Lo |
| 2006/0123053 A1 | 6/2006 | Scannell |
| 2006/0129313 A1 | 6/2006 | Becker et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0005233 A1 | 1/2007 | Pinkus et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1 | 3/2007 | Huang et al. |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0128900 A1 | 6/2007 | Bauman |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 | 8/2007 | Bliss et al. |
| 2007/0203644 A1 | 8/2007 | Thota et al. |
| 2007/0208495 A1 | 9/2007 | Chapman et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0225882 A1 | 9/2007 | Yamaguchi et al. |
| 2007/0244627 A1 | 10/2007 | Boss et al. |
| 2007/0250259 A1 | 10/2007 | Dare |
| 2007/0257792 A1 | 11/2007 | Gold |
| 2007/0293958 A1 | 12/2007 | Stehle et al. |

| | | | |
|---|---|---|---|
| 2008/0015763 | A1 | 1/2008 | Kitazaki et al. |
| 2008/0033644 | A1 | 2/2008 | Bannon |
| 2008/0046134 | A1 | 2/2008 | Bruce et al. |
| 2008/0046165 | A1 | 2/2008 | Downs et al. |
| 2008/0200312 | A1 | 8/2008 | Tagliabue |
| 2008/0293430 | A1 | 11/2008 | Blom et al. |
| 2008/0312819 | A1 | 12/2008 | Banerjee |
| 2009/0005973 | A1* | 1/2009 | Salo et al. ............ 701/209 |
| 2009/0012703 | A1 | 1/2009 | Aso et al. |
| 2009/0048771 | A1 | 2/2009 | Speier et al. |
| 2009/0082917 | A1 | 3/2009 | Adachi |
| 2010/0036610 | A1 | 2/2010 | Urciuoli et al. |

FOREIGN PATENT DOCUMENTS

| | | | |
|---|---|---|---|
| JP | 2002156234 | A | 5/2002 |
| KR | 1020060016832 | A | 2/2006 |
| WO | WO0002389 | A1 | 1/2000 |
| WO | WO0108413 | A1 | 2/2001 |
| WO | WO0239367 | A1 | 5/2002 |
| WO | 03019478 | A1 | 3/2003 |
| WO | 03042950 | A1 | 5/2003 |
| WO | WO03063521 | A2 | 7/2003 |
| WO | WO2004084437 | A1 | 9/2004 |
| WO | 2005024667 | A1 | 3/2005 |
| WO | 2007131225 | A2 | 11/2007 |

OTHER PUBLICATIONS

Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.
New Magellan (Thales) MAESTRO4000 Vehicle Navigation System http://cgi.ebay.com/NEW-MAESTRO4000-Vehicle-Navigation-System-980919-01_W0QQitemZ110163915037QQihZ001QQ categoryZ73332QQcmdZViewItem. Last accessed Oct. 4, 2007, 5 pages.
Moshe Ben-Akiva, et al. Development of a Route Guidance Generation System for Real-Time Application http://rosowww.epfl.ch/mbi/papers/chania.pdf. Last accessed Apr. 10, 2007, 6 pages.
W. -T. Balke, et al. A Situation-aware Mobile Traffic Information System http://www.I3s.de/~balke/paper/hicss03.pdf. Last accessed Apr. 10, 2007, 10 pages.
Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.
Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.
Sergi Marti, et al. DHT Routing Using Social Links. http://iptps04.cs.ucsd.edu/papers/marti-social.pdf. Last accessed Oct. 3, 2007, 6 pages.
Antonio Kruger, et al. The Connected User Interface: Realizing a Personal Situated Navigation Service. IUI'04, Jan. 13-16, 2004, Madeira, Funchal, Portugal. ACM 1-58113-815-6/04/0001 www.medien.ifi.lmu.de/pubdb/publications/pub/butz2004userinterface/butz2004userinterface.pdf. Last accessed Oct. 3, 2007, 8 pages.
Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.
Boualem Benatallah, et al. Ocean—Scalable and Adaptive Infrastructure for On-board Information Access, UNSW-CSE-TR-0601, Jan. 2006. http://www.cse.unsw.edu.au/~llibman/papers/unsw601.pdf. Last accessed Oct. 3, 2007, 14 pages.
N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.
Alessandra Agostini, et al. Integrated Profile Management for Mobile Computing http://webmind.dico.unimi.it/papers/Al21A.pdf. Last accessed Oct. 3, 2007, 5 pages.
MPOS AdSpace http://www.xiam.com/xiam.products.adspace.shtml. Last accessed Oct. 5, 2007, 1 page.
Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.
Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.
S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/Tr%20B%2004%20rc.pdf. Last accessed Oct. 3, 2007, 22 pages.
Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.
Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.
Gunther Retscher, et al. NAVIO—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.
About Amaze, 2000-2007 LocatioNet Systems Ltd http://www.amazegps.com/docs/amAze_UM_en%203.1.pdf. Last accessed Oct. 4, 2007, 37 pages.
Route 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.
Vijoy Pandey, et al. Exploiting User Profiles to Support Differentiated Services in Next-Generation Wireless Networks. Jul. 15, 2002 http://networks.cs.ucdavis.edu/~ghosal/Research/publications/vijoy-profiling-network-magazine.pdf. Last accessed Oct. 4, 2007, 23 pages.
Broadhurst, et al., Monte Carlo Road Safety Reasoning, presented at the IEEE Intelligent Vehicle Symposium (IV2005), IEEE.
Final Office Action mailed Oct. 5, 2011 in U.S. Appl. No. 11/957,127.
Non-Final Office Action mailed Sep. 28, 2011 in U.S. Appl. No. 11/957,219.
Non-Final Office Action mailed Aug. 9, 2011 in U.S. Appl. No. 12/033,652.
Final Office Action mailed Sep. 14, 2011 in U.S. Appl. No. 12/033,627.
Non-Final Office Action mailed Jul. 21, 2011 in U.S. Appl. No. 11/957,139.
Non-Final Office Action mailed Aug. 23, 2011 in U.S. Appl. No. 11/957,206.
Non-Final Office Action mailed Oct. 6, 2011 in U.S. Appl. No. 11/957,151.
Notice of Allowance mailed Aug. 24, 2011 in U.S. Appl. No. 11/957,182.
"iCarpool http://www.icarpool.com/enlTransportationPlanner.htm. Last accessed Dec. 11, 2007, 2 pages."
"Ecolane Dynamic CarpoolTM, Ecolane Finland Oy 2006. http://www.ecolane.com/services/carpool/index.html. Last accessed 12/11107, 1 page."
"Route Planner, vol. 3 -Modules, (Route Planner—Sep. 6, 2002—LA-UR-00-1767—TRANSIMS 3.0). http://ndssl.vbi.v1.edu/PublicationslTransimsVol3Ch4.pdf. Last accessed Dec. 11, 2007,60 pages."
"Meredith Williams. Reduce Stress and Stay Organized While Running Errands http://www.microsoft.com/athome/intouch/directions.mspx. Last accessed Dec. 11, 2007, 3 pages."
"TomTom Itinerary Planning http://www.gpsreview.netltomtom-itinerary-planning/. Last accessed Dec. 11, 2007, 12 pages."
"Pilot Tests of Dynamic Ridesharing, updated Jan. 23, 2007. http://www.ridenow.org/ridenow_summary.html. Last accessed Dec. 11, 2007, 35 pages."
"Goncalo Correia, et al. Car Pooling Clubs: Solution for the Affiliation Problem in Traditional/Dynamic Ridesharing Systems http://www.iasi.cnr.itlewgtl16conference/ID92.pdf. 6 pages."

Atlanta Unveils Traffic Reduction Plan, posted Aug. 28,2007. http://www.environmentaldefense.org/article .cfm?contentl 0=6812. Last accessed Dec. 11, 2007, 1 page.

James Baring. The Solution to the Traffic Congestion Problem, Dec. 1, 2006. http://revelstoke.org.uklgsmpccs.htm. Last accessed Dec. 11, 2007, 5 pages.

Martin O'Hara. Automated Congestion Charge Payment Scheme Using Smartnav Intelligent Satellite Navigation System, Apr. 13, 2005. Last accessed Dec. 11, 2007, 7 pages. http://www.tridatacom.co. ukiDownloads/papers/Papers/Rl N%20Congestion%20 130405.pdf.

Lisa J. Molnar, et al. Developing Information Systems for the Driving Tourist: A Literature Review, Feb. 1996. http://66.1 02.1.1 04/scholar?hl=en&lr=&q=cache:GJzx9CvxhCQJ:sambuca.umdl.umich.edu:80801/handle/2027.42/1160. Last accessed Dec. 11, 2007, 81 pages.

Federal Highway Administration FHWA Domestic Pedestrian Safety Scanning Tour, Sep. 2005. http://66.1 02.1 .1 04/scholar?h 1=en&lr=&q=cache :3cGz2QG EKH kJ :www.cdtcmpo.org/bike/pedsafety.pdf. Last D accessed 12111107, 64 pages.

Christine M. Johnson. The National ITS Program: Where We've Been and Where We're Going http://66.1 02.1.1 04/scholar?hl=en&lr=&q=cache:flK6zDerzTQJ:plan20p. fhwa.dol.gov/pdfs/Pdfl/Edl03531.pdf. Last D accessed Dec. 11, 2007, 12 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontenl.cgi?article=1254&context=its/path. Last accessed Dec. 7, 2007, 48 pages.

Modelling the impact of incentives on route choice and traffic safety using a route choice simulator experiment http://www.aida.utwente.nl/NieuwsNacancLAIDA-STOK_pilol.whlinkl. Last accessed 12110/07,7 pages.

"Field Service Route Optimization for Energy and Cost Efficiency" http://www.californiagreensolutions.com/cgi-bin/glltpl.h,content=381. Last accessed Dec. 10, 2007, 2 pages.

Franziska Klugl, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.ukl71111.html. Last accessed Dec. 11, 2007, 21 pages.

Non-Final Office Action mailed Aug. 17, 2010 in U.S. Appl. No. 12/033,690.

Final Office Action mailed Feb. 1, 2011 in U.S. Appl. No. 12/033,690.

Final Office Action mailed Mar. 18, 2011 in U.S. Appl. No. 12/033,652.

Non-Final Office Action mailed Aug. 17, 2010 in U.S. Appl. No. 12/033,652.

Non-Final Office Action mailed Aug. 23, 2010 in U.S. Appl. No. 11/957,210.

Final Office Action mailed Dec. 13, 2010 in U.S. Appl. No. 11/957,210.

Non-Final Office Action mailed Nov. 1, 2010 in U.S. Appl. No. 11/957,182.

Final Office Action mailed Feb. 14, 2011 in U.S. Appl. No. 11/957,182.

Non-Final Office Action mailed Nov. 19, 2010 in U.S. Appl. No. 11/957,206.

Non-Final Office Action mailed Mar. 8, 2011 in U.S. Appl. No. 11/957,115.

Non-final Office Action mailed Mar. 25, 2011 in U.S. Appl. No. 11/957,219.

Non-Final Office Action mailed Mar. 29, 2011 in U.S. Appl. No. 12/033,627.

Non-Final Office Action mailed Mar. 30, 2011 in U.S. Appl. No. 11/957,167.

International Search Report with Written Opinion dated Jun. 29, 2009 (PCT/US2008/083543).

International Search Report with Written Opinion dated Jun. 22, 2009 (PCT/US2008/083538).

International Search Report with Written Opinion dated Aug. 24, 2009 (PCT/US2009/030377).

International Search Report with Written Opinion dated Aug. 24, 2009 (PCT/US2009/030380).

Non-Final Office Action mailed Apr. 27, 2011 in U.S. Appl. No. 11/957,127.

Non-Final Office Action mailed Jun. 13, 2011 in U.S. Appl. No. 12/033,690.

Non-Final Office Action mailed May 27, 2011 in U.S. Appl. No. 11/957,139.

Final Office Action mailed Apr. 21, 2011 in U.S. Appl. No. 11/957,206.

Non-Final Office Action mailed May 3, 2011 in U.S. Appl. No. 11/957,210.

Final Office Action mailed Aut. 29, 2011 in U.S. Appl. No. 11/957,115.

Notice of Allowance mailed Oct. 27, 2011 in U.S. Appl. No. 11/957,210.

Non-Final Office Action mailed Mar. 13, 2012 in U.S. Appl. No. 11/957,127, 7 pages.

Non-Final Office Action mailed Mar. 28, 2012 in U.S. Appl. No. 12/033,627, 12 pages.

Non-Final Office Action mailed May 15, 2012 in U.S. Appl. No. 11/957,206, 10 pages.

Final Office Action mailed Apr. 12, 2012 in U.S. Appl. No. 11/957,151, 15 pages.

Final Office Action mailed Jan. 24, 2012 in U.S. Appl. No. 11/957,219.

Final Office Action mailed Dec. 1, 2011 in U.S. Appl. No. 12/033,690.

Final Office Action mailed Feb. 1, 2012 in U.S. Appl. No. 12/033,652.

Final Office Action mailed Jan. 13, 2012 in U.S. Appl. No. 11/957,139.

Final Office Action mailed Dec. 22, 2011 in U.S. Appl. No. 11/957,206.

Final Office Action mailed Aug. 22, 2012 in U.S. Appl. No. 11/957,206, 8 pages.

Notice of Allowance mailed Dec. 21, 2012 in U.S. Appl. No. 11/957,127, 8 pages.

Final Office Action mailed Nov. 16, 2012 in U.S. Appl. No. 12/033,627, 12 pages.

* cited by examiner

ADDITIONAL CONTENT BASED ON INTENDED TRAVEL DESTINATION

CROSS-REFERENCE

This application relates to U.S. patent application Ser. No. 11/957,115 entitled "ROUTE MONETIZATION".

This application relates to U.S. patent application Ser. No. 11/957,127 entitled "FEDERATED ROUTE PRODUCTION".

This application relates to U.S. patent application Ser. No. 11/957,139 entitled "DESTINATION AUCTIONED THROUGH BUSINESS OF INTEREST".

This application relates to U.S. patent application Ser. No. 11/957,151 entitled "GENERATIONAL INTELLIGENT NAVIGATION MANIPULATION".

This application relates to U.S. patent application Ser. No. 11/957,167 entitled "SOCIAL NETWORK BASED ROUTES".

This application relates to U.S. patent application Ser. No. 11/957,182 entitled "ROUTE TRANSFER BETWEEN DEVICES".

This application relates to U.S. patent application Ser. No. 11/957,206 entitled "AUTOMATIC SPLICES FOR TARGETED ADVERTISEMENTS".

This application relates to U.S. patent application Ser. No. 11/957,210 entitled "PEDESTRIAN ROUTE PRODUCTION".

This application relates to U.S. patent application Ser. No. 11/957,219 entitled "ROUTE GENERATION BASED UPON ACTIVITY CRITERIA".

TECHNICAL FIELD

The subject specification relates generally to traffic routing and in particular to provided added content based on an intended destination.

BACKGROUND

Computer-driven route planning applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer-implemented mapping applications often include route-planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she wishes to avoid highways. Similarly, a user can inform the route planning application that she wishes to travel on a shortest route or a route that takes a least amount of time (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Classical route generation systems provide a vehicle operator with directions from a start point to an intended destination. The directions are typically based upon certain constraints, such as having a fastest route, a route with shortest distance, avoiding highways, circumventing toll sections, etc. Directions can be produced at a home from a computer and then printed to a paper copy, uploaded to an automobile computer system, created 'on-the-fly' though an in-vehicle navigation system, etc.

The disclosed innovation provides relevant details associated with an intended travel destination to an operator. Information relating to the operator, a route, and a destination can be gathered and based upon analysis, a selection is made on details to present to a vehicle user. A wide assortment of information can be presented to a user, ranging from advertisements of businesses near the intended destination to situational information (e.g., a traffic accident). The innovation can configure with various financial capabilities, whereby fiscal transactions take place in accordance with providing intended destination details.

In a conventional vehicle, an operator typically has a relatively large number of activities and functions. In an automotive example, in addition to driving, there can be distractions from other members in the vehicle, operation of cellular telephones, meal consumption, and the like. It seems illogical to provide an operator with more information that can distract him/her from the function of driving and cause a greater likelihood of having an accident. However, an unexpected result occurs such that the operator can become a better driver by having quality information that relates to an intended destination. The information can make the operator more aware of details that can become relevant concerning the intended destination. For instance, if a user learns of available parking at an intended destination, then he/she will likely spend less time on a road searching for parking and have a lower chance of having an accident.

The following description and the annexed drawings set forth certain illustrative aspects of the specification. These aspects are indicative, however, of but a few of the various ways in which the principles of the specification can be employed. Other advantages and novel features of the speci-

DETAILED DESCRIPTION

Figure 1:
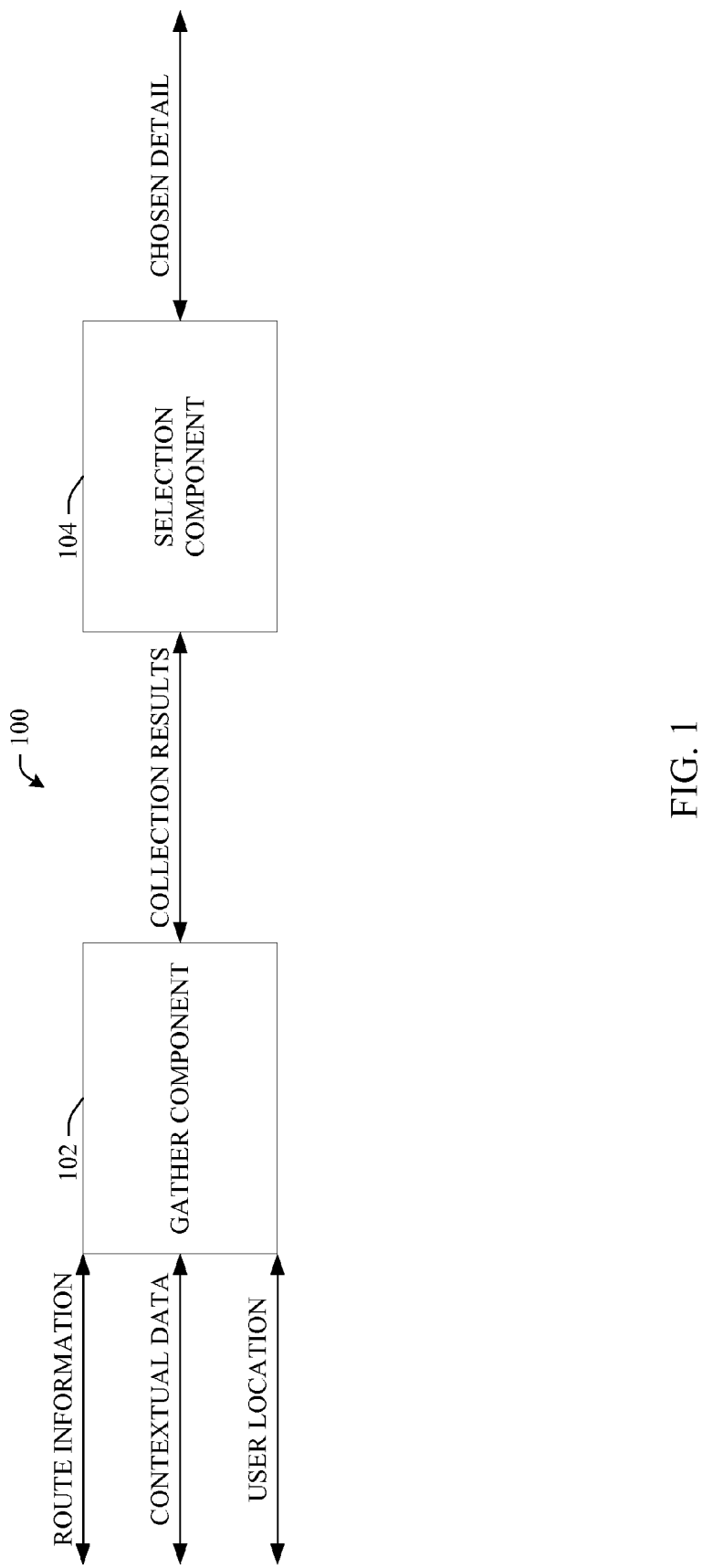
FIG. 1 illustrates a representative intended destination detail selection system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for providing information relevant to an intended destination to a user. The user commonly follows specific actions of a computer-generated route, such as turn left at 'Market Street', to arrive at an intended destination. In order to have an improved travel experience, information relating the intended destination can be provided to the user (e.g., vehicle operator, vehicle passenger, etc.)

A gather component 102 collects input such as route information, a user location, and contextual data. In order to reach a destination, a user can have a route that he/she intends to follow through operation of a vehicle (e.g., automobile, motorcycle, bicycle, airplane, helicopter, motorboat, self-balancing transportation device, etc.). Route information collection can take place according to various manners. A computer-generated route can be produced on a vehicle navigation system whereby the gather component 102 extracts the route from the navigation system. A user can produce a route from a home computer through an Internet web site; the home computer can communicate with the gather component 102 and transfer the route. Moreover, learning can take place upon the gather component 102. For example, at 8:30 am on weekdays, the user can often drive from her home to her office. The gather component 102 can make note of a driving pattern and infer (e.g., through artificial intelligence techniques) that a route will be from her home to her office at a requisite time.

In a further embodiment, operational patters of more then about one individual can be taken into account to learn information and modify operation of the system 100. A central server can track implementations of the system 100 in multiple vehicles, portable electronic units, etc. In an illustrative example, company can operate a chain of stores that sell business suits for men. The central server can track that men with a characteristic of being retired typically do not accept detours to pass the suit store, even when a relatively high amount of money is offered. The central server can infer (e.g., through artificial intelligence techniques) that retired men do not desire to take detours past suit stores and the gather component 102 can use the inference result to filter out requests made by the suit store, instruct monetization suggestions (e.g., suggest to the suit store how much should be offered), influence operation of the system 100, etc.

The system 100 can be used to balance traffic, business, etc. For instance, during a popular event where a relatively large number of vehicles are expected to park, the system 100 can instruct some people to go to a first parking area (e.g., a north parking lot) and others to travel to a subsequent parking area (e.g., a south parking lot) in order to keep traffic flowing smoothly. Similarly, if there is an accident or traffic jam, the system 100 can route different users with different alternate routes to balance the traffic. A central server can communicate traffic balance information as contextual data to the gather component 102 and the selection component 104 uses the traffic balance information in choosing a detail for disclosure.

A user location can be relevant when determining details to disclose concerning an intended destination. For instance, if a user operating an automobile is over two hours away from the intended destination, then traffic accident information is likely irrelevant. Traffic pattern changes due to a likely fact that the accident will not be current when the user arrives at the destination since emergency services will eliminate restrictions (e.g., blocked lanes will open, damaged automobiles will be moved, etc.) Large amounts of contextual data can become important in determining relevant information to disclose to a user. A non-exhaustive list of contextual data includes available details that can be disclosed to a user, weather information, traffic histories, event schedules, business sales, traffic pattern estimations, etc.

The gather component 102 transfers collection results to a selection component 104. The transfer can be a continuous stream (e.g., as information is collected, it transfers to the selection component 104 immediately), a single block (e.g., information is retained in storage and transferred to the selection component 104 as a single event), be placed in storage and the selection component 104 reads collection results off the storage, etc. The selection component 104 chooses a detail associated with an intended location (e.g., intended destination, intended route waypoint, intended placement on a path, etc.) to present to a user, where the detail choice is based upon route information, the user location, contextual data, or a combination thereof. It is to be appreciated that an intended destination does not have to be a final destination—for example, the intended destination can be an intermediate destination (e.g., a person leaving an office can have a final destination of home, but a first intended destination of stopping at a fuel station). Through detailed analysis, the selection component 104 can determine a detail that would be beneficial to disclose to a user.

According to one embodiment, the chosen detail is a commercial detail, such as a product advertisement, a coupon, information concerning a sale, etc. For example, if the intended destination is a grocery store, then the selection component 104 can choose to information a user about a sale on milk. In a different instance, if the intended destination is a rental store, then the user can be informed that a bank is located nearby with a goal that the user will stop by the bank to make a financial transaction. In addition, a user can be driving a vehicle on a road upon a generated driving path. The system 100 can determine it is twelve noon and a user has not eaten lunch nor has a plan on where to eat lunch (e.g., learned through examination of a user schedule, monitoring of automobile conversation, etc.) A commercial detail can be submitted to the user to entice the user to have lunch at a particular restaurant near the road.

Moreover, the selection component 104 can choose the detail based upon a financial consideration. A number of businesses near an intended destination can have a desire to have their name be presented to a user. An auction can take place through the selection component 104 or another device, such as a remote database, where different businesses offer to pay a fee to have a commercial detail presented. However, a flat rate can be paid for a set amount of presentations (e.g., about 1000 presentations) and the selection component 104 determines an appropriate instance in which to disclose a paid commercial detail. Determination by the selection component 104 on if an instance is appropriate can be based upon demographics of a user/vehicle occupants, detail supplier conditions (e.g., disclose a detail stating a store sells umbrellas when there is rainfall), manually pushed by a supplier (e.g., if a store is not busy, then a retailer can communicate to the system to disclose a detail concerning a discount offer), etc.

The following is an illustrative operation of the system 100 implemented upon an automobile. A user can be traveling from a suburban area to a metropolitan downtown district to attend a professional baseball game. Along the journey, the gather component 102 collects data and transfers the data to the selection component 104. As the user approaches a stadium in which the baseball game is to played, the selection component 104 analyzes the collection results. The selection component 104 can determine to present the user with an available parking lot that is offering discount parking for the game. While portions of the subject specification disclose aspects of the gather component 102 and selection component 104 implementing upon a vehicle, it is to be appreciated that there can be other implementations (e.g., upon a personal electronic device, at a remote location, etc.).

Figure 2:
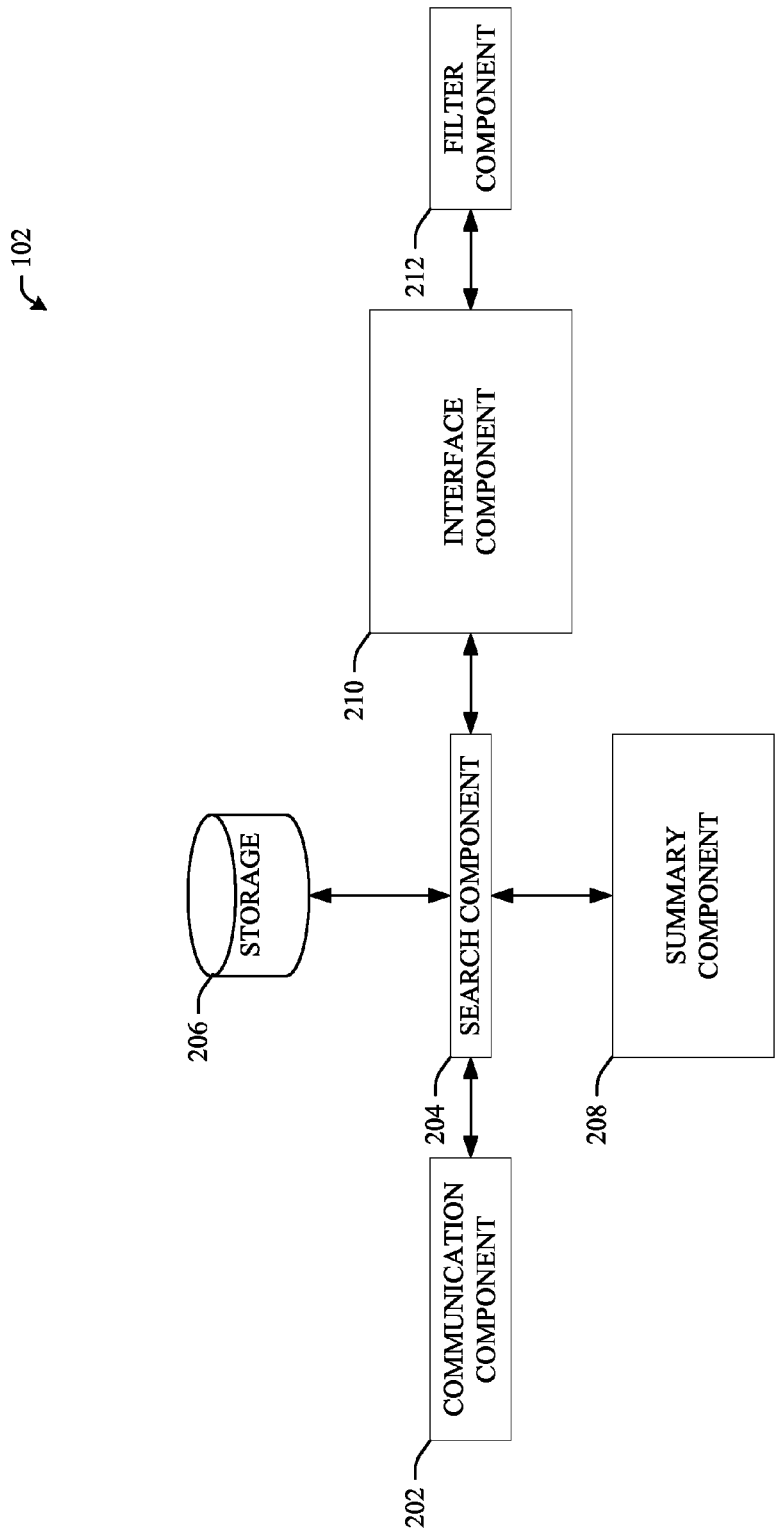
FIG. 2 illustrates a representative gather component in accordance with an aspect of the subject specification.

FIG. 2 discloses an example gather component 102 used in various aspects disclosed herein. A communication component 202 can engage with other devices to transfer information. Operation can take place wirelessly, in a hard-wired manner, employment of security technology (e.g., encryption), etc. Moreover, the communication component 202 can utilize various protective features, such as performing a virus scan on obtained data and blocking information that is positive for a virus.

A search component 204 locates sources of route information, a user location, and contextual data and extracts at least some details from located sources—commonly done through utilization of the communication component 202. The search component 204 can search storage 206 (e.g., local, remote, etc.) in order to locate route information, such as a route a vehicle is predicted to take. In addition, a global positioning system can supply user location information obtained by the search component 204. Moreover, a data network (e.g., the Internet), can be contacted in order to determine contextual data (e.g., available details to present to the user). The search component 204 can also gain contextual information from a personal profile retained in storage 206.

The personal profile can be created through a summary component 208. The summary component 208 constructs a profile of at least one creature—construction includes both building the profile as well as updating the profile, commonly thorough adaptive learning. A creature is generally a person in the vehicle operating the system 100 of FIG. 1; however, a creature does not have to be a person, for example, a creature can be a family pet. According to one embodiment, when a person enters a vehicle, they 'log-on' to an on-board computer (e.g., a driver and passengers). If a profile has not been created, then the summary component 208 builds the profile; if there is an existing profile, then the summary component 208 updates the profile. The profile can include information such as physical characteristics, personal interests, etc.

The personal profile can then be retained in storage 206 that is accessed by the search component 204. Storage 206 can arrange in a number of different configurations, including as random access memory, battery-backed memory, hard disk, magnetic tape, etc. Various features can be implemented upon storage, such as compression and automatic back up (e.g., use of a Redundant Array of Independent Drives configuration).

An interface component 210 allows a person to enter specific information that can be used by the selection component 104 of FIG. 1. For example, a vehicle operator can desire to travel to a university in a rural area. The operator does not know the address; however, the university is in a small town and once in the small town the university is easy to find (e.g., the operator will follow roadside signs). While a route states to go to the city center, the operator can provide contextual information through the interface that she is actually looking to travel to the university. Example interface components 210 can include a touch screen (e.g., a screen that can also present information), a microphone, a keyboard, etc. A user can input information thorough the interface component 210 requesting alerts. For instance, the user can input that a notification should be announced when an outlet mall is within a given radius of an intended location (e.g., a point along a route).

Information from the search component 204, storage 206, the interface component 210, an auxiliary location, etc. can be processed by a filter component 212 that limits information that can pass to the selection component 104 of FIG. 1. The search component 204 and the interface component 210 can gather a relatively large amount of information—so much information that the selection component 104 of FIG. 1 becomes overburdened and does not operate efficiently (e.g., there would need to be a large amount of processing that would slow operation). The filter component 212 can pass some information to the selection component 104 of FIG. 1 while stopping other information. Internal logic (e.g., complex algorithms) can be used in order to determine what information would be beneficial to the selection component 104 of FIG. 1 and what would be extraneous. Moreover, the internal logic can be modified, such by a technician or done adaptively, to correct errors (e.g., information is passing that should not, information is being blocked that should not, etc.), improve performance, etc.

Figure 3:
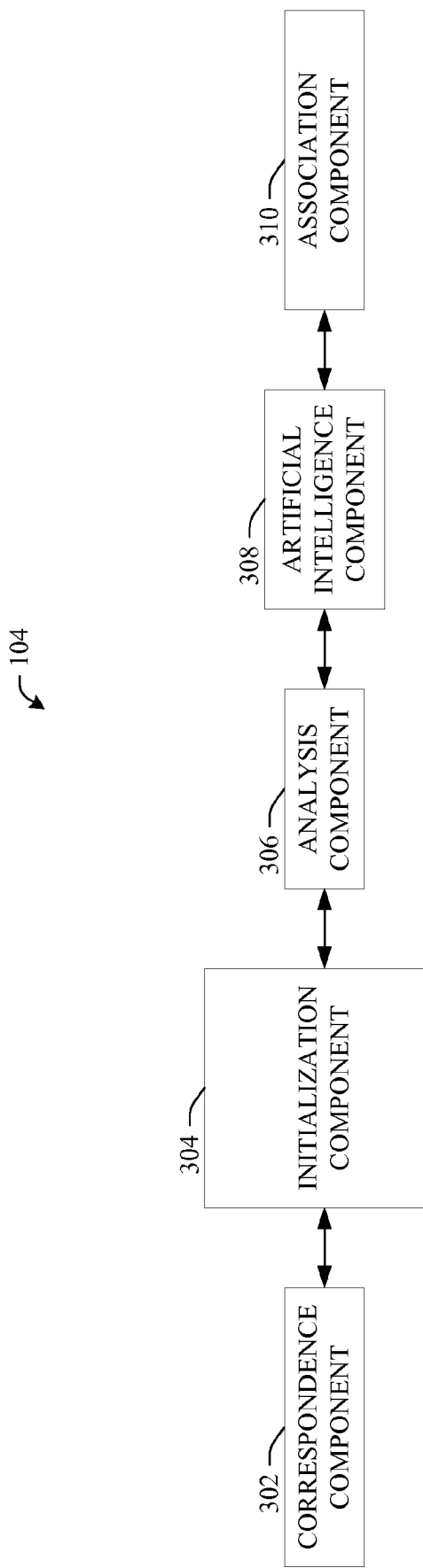
FIG. 3 illustrates a representative selection component in accordance with an aspect of the subject specification.

FIG. 3 discloses an example selection component 104. A correspondence component 302 can engage with other devices to transfer information. Operation can take place wirelessly, in a hard-wired manner, employment of security technology (e.g., encryption), etc. Moreover, the correspondence component 302 can utilize various protective features, such as performing a virus scan on obtained data and blocking information that is positive for a virus.

An initialization component 304 allows an individual to be provided additional destination content automatically. While a user can request additional content through the interface component 210 of FIG. 2, the user can also be provided content automatically. For instance, as a user becomes geographically close to an intended destination, the initialization component 304 sends a signal that commercial detail information be disclosed to the user automatically.

An analysis component 306 evaluates collection results. Commonly various calculations can be performed by the analysis component 306 to provide an evaluation. For instance, interests stored in a personal profile can be compared against available businesses near an intended destination. If a user has a history of struggling to find a parking space in a crowed location, then the analysis component can perform an evaluation to determine parking lots near an intended destination. The analysis component 306 can operate as a means for analyzing an intended travel destination of a user as well as a means for evaluating information, where a means for commissioning information associated with the intended travel destination for presentment to the user utilizes the evaluated information to commission information.

Artificial intelligence component 308 makes at least one inference or at least one determination in relation to detail choice. Various scenarios can occur that are processed by the artificial intelligence component 308. For example, the artificial intelligence component 308 can receive evaluations of the analysis component 306 and determine details related to an intended destination that should be presented to a user based upon the evaluations. Moreover, a fast food restaurant chain can pay for about ten presentations when a particular vehicle has an intended destination near a restaurant. In one instance, a fast food restaurant is about two miles from the intended destination, but is the closest eating establishment. The artificial intelligence component 308 can infer that this is a quality instance to present a commercial detail and send a notification that the commercial detail should be disclosed.

Artificial intelligence component 308 can employ one of numerous methodologies for learning from data and then drawing inferences and/or creating making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems. The artificial intelligence component 308 can function as a means for commissioning information associated with the intended travel destination for presentment to the user, where commissioning information is based upon a result of the analyzed intended travel destination.

An association component 310 integrates a detail with an intended destination. A determination can be made by the artificial intelligence component 308 that a traffic report should be provided to an operator. However, the operator is about two hours away from the intended destination. The association component 310 can monitor operations and link the report with the intended destination and when the vehicle becomes close to the intended destination, the traffic report can be disclosed.

Figure 4:
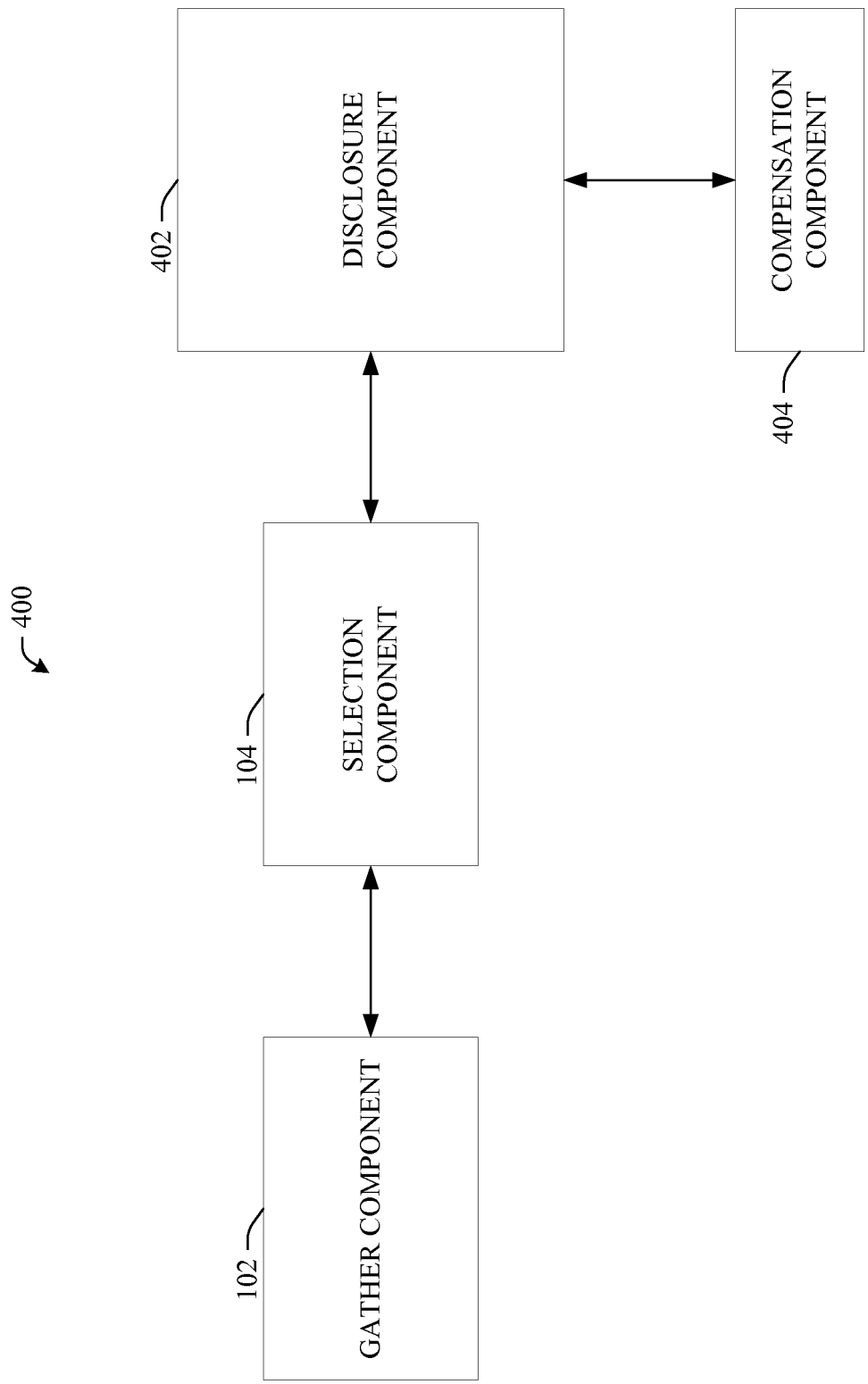
FIG. 4 illustrates a representative intended destination detail selection system with a disclosure component and compensation component in accordance with an aspect of the subject specification.

FIG. 4 discloses an example system 400 for disclosing a detail associated with an intended destination and performing a calculation in conjunction with the disclosure. A gather component 102 collects route information, a user location, and contextual data and transfers them to a selector component 104. The selection component 104 chooses a detail associated with an intended location to present to a user, where the detail choice is based upon route information, the user location, contextual data, or a combination thereof.

A disclosure component 402 presents the chosen detail to the user. A disclosure component 402 allows an individual to appreciate a selected detail and act upon the detail. A non-exhaustive list of disclosure components include a display screen, touch screen, speaker system, virtual reality environment, Braille production system, printer, etc. In addition, the disclosure component 402 can present information in multiple formats, such as showing a video with audio capabilities.

According to one embodiment, the gather component 102 can receive information that a red light at a particular intersection an automobile running the system 400 is arriving at lasts for about twelve seconds. The selection component 104 chooses a commercial detail video that lasts for about twelve seconds. This allows a user to appreciate the commercial detail without being distracted during moving vehicle operations.

Furthermore, the disclosure component 402 can include adaptive logic for information presentation. An automobile operating the system 400 can include a video monitor in a center console next to a steering wheel as well as audio speakers. A selected commercial detail can last for about thirty seconds while a stop light lasts for about fifteen seconds. In one embodiment, while the automobile is at the stop light, a video plays with sound—when the automobile is in motion the video stops and sound is played, thus causing less distraction to an operator.

In addition to a disclosure component 402, the system 400 can be equipped with a compensation component 404. The compensation component 404 provides a reward in relation to presentment of the chosen detail to the user. Operation of the compensation component 404 generally enables a fiscal transaction to take place; however, non-fiscal implementations can be practiced (e.g., a driver is awarded video game points that can be exchanged for prizes for listening to a commercial detail).

Different configurations allow transactions to take place—for example, a user can be paid money from an advertiser for being subjected to the commercial detail. In addition, a user can pay money to a provider of the system 400 to be presented with valuable traffic information (e.g., an intended destination has heavy traffic, so a message is transmitted to the user's personal digital assistant that she should leave earlier then expected).

Figure 5:
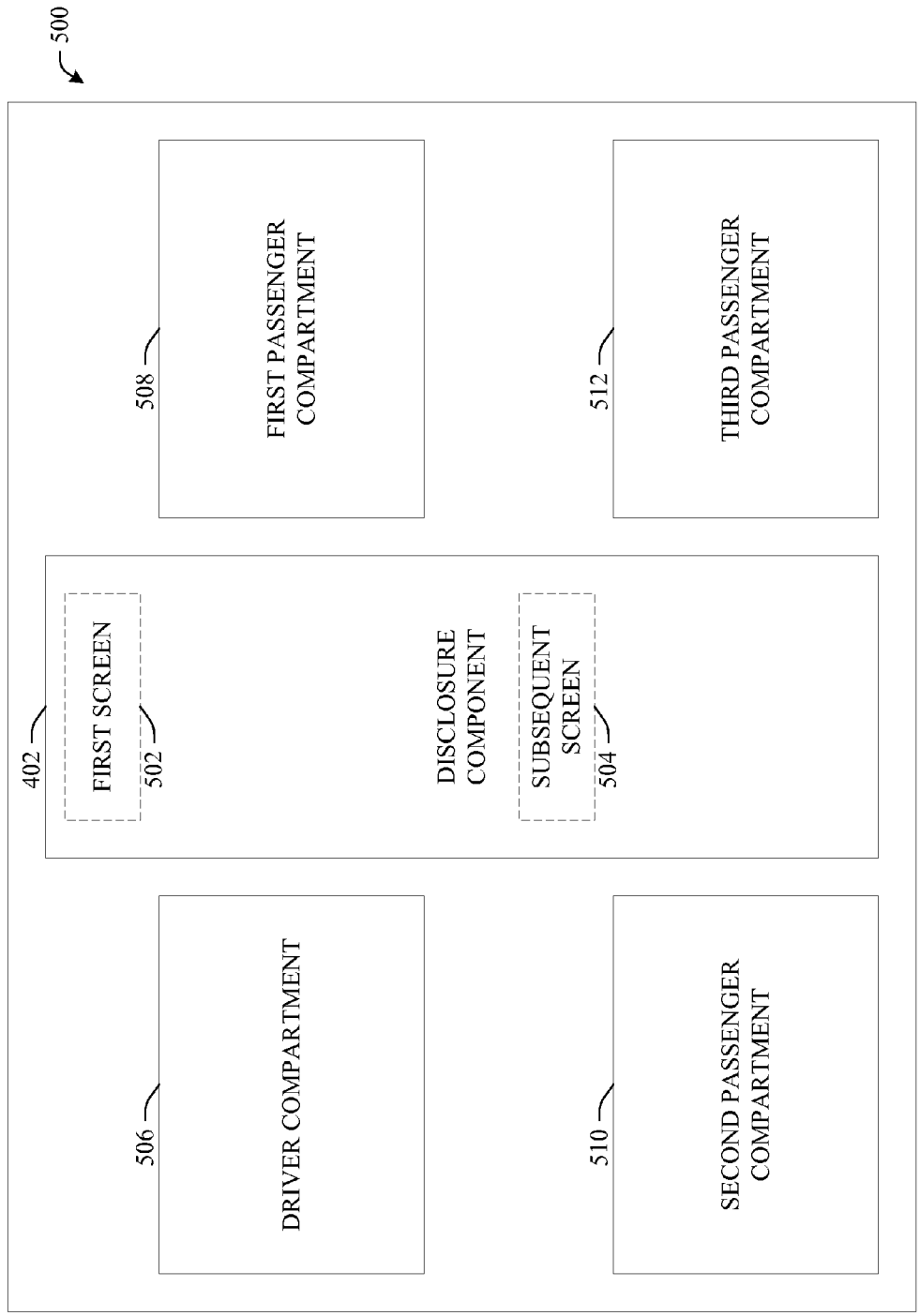
FIG. 5 illustrates a representative vehicle integrated with a disclosure component in accordance with an aspect of the subject specification.

FIG. 5 discloses an example vehicle 500 integrated with a disclosure component 402. According to one embodiment, the disclosure component 402 presents two details chosen by the selection component 104 of FIG. 1, where a first detail is presented on a first portion (e.g., first screen 502) of the disclosure component 402 and a subsequent detail is presented on a subsequent portion (e.g., subsequent screen 504) of the disclosure component 402.

For example, a parent can be seated in a driver compartment 506 and his spouse can be seated in a first passenger compartment 508, both located toward a front of the vehicle 500. A commercial detail can be played on the first screen 502 for a fast food restaurant located near an intended destination where the commercial detail is for new health foods offered at the restaurant. Children can be seated in a second passenger compartment 510 and a third passenger compartment 512 located at a rear of the vehicle. The children can be presented with a commercial detail for the restaurant highlighting a new toy available in a children's meal.

Other configurations can be practiced relating to multiple details disclosed to different parties. A first portion can be a video screen while the second portion is audio speakers. Moreover, the first detail and the second detail can be presented simultaneously or in a staggered manner. In addition, details can be tailored for different individuals in a vehicle (e.g., passengers have their own portions). Operation of the disclosure component 402 can be taken out of a vehicle context—for instance, different details can be presented on different mediums located in a common location (e.g., a cinema sound system, where different theaters are presented information based on estimated routes to a parking lot, such as disclosing nearest bathrooms).

Figure 6:
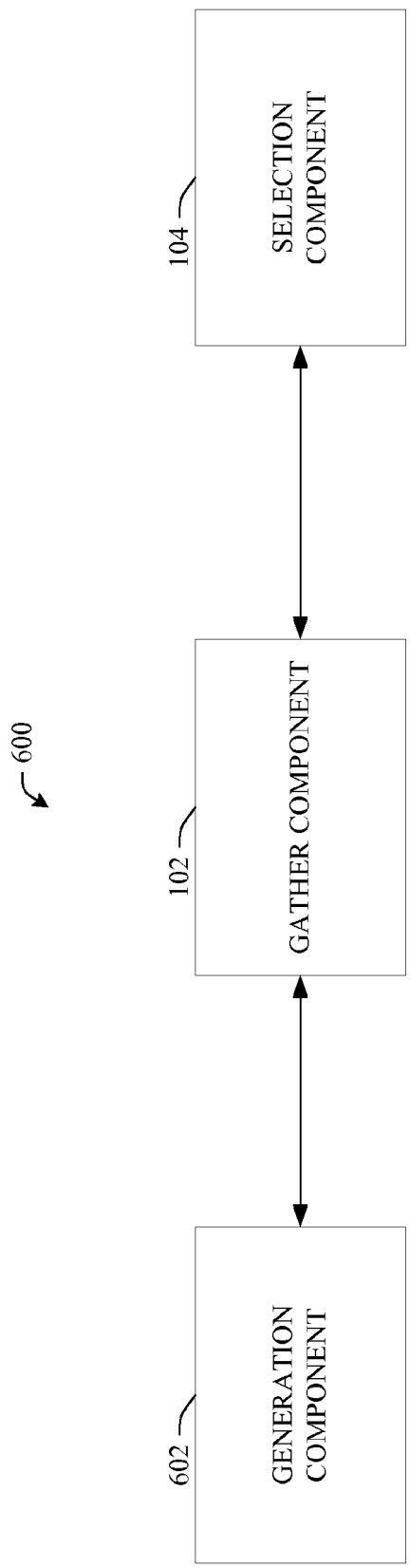
FIG. 6 illustrates a representative intended destination detail selection system with a generation component in accordance with an aspect of the subject specification.

FIG. 6 discloses an example system 600 for detail selection integrated with a generation component 602. A generation component 602 can create a route that is taken by a vehicle and alter the route when appropriate, such as when an unexpected detour is encountered. The created route is generally transferred to a gather component 102 along with metadata concerning the route (e.g., time the route was constructed, constrictions taken into consideration for the route, such as avoiding highways, etc.)

Various features can integrate with the generation component 602 to enhance functionality. The generation component 602 can predict an intended destination of a user and make route alterations automatically based upon a detail chosen by a selection component 104. For instance, a user can have an intended destination of an opera house where a constructed route leads the user to the opera house. The detail can be a notification of a parking garage near the opera house that has a history of short exit wait time after large events. The generation component 602 can automatically alter the route to lead the user to the parking garage; conversely, a user can request the change through engagement with a disclosure component 402 of FIG. 4 (e.g., applying pressure upon a designated area of a touch screen).

A gather component 102 collects route information, a user location, and contextual data and transfers them to a selector component 104. The route information can originate from the generation component 602 as well as from other locations (e.g., an operator has two possible routes and mixes the routes on her own). The selection component 104 chooses a detail associated with an intended destination to present to a user, where the detail choice is based upon route information, the user location, contextual data, or a combination thereof.

Figure 7:
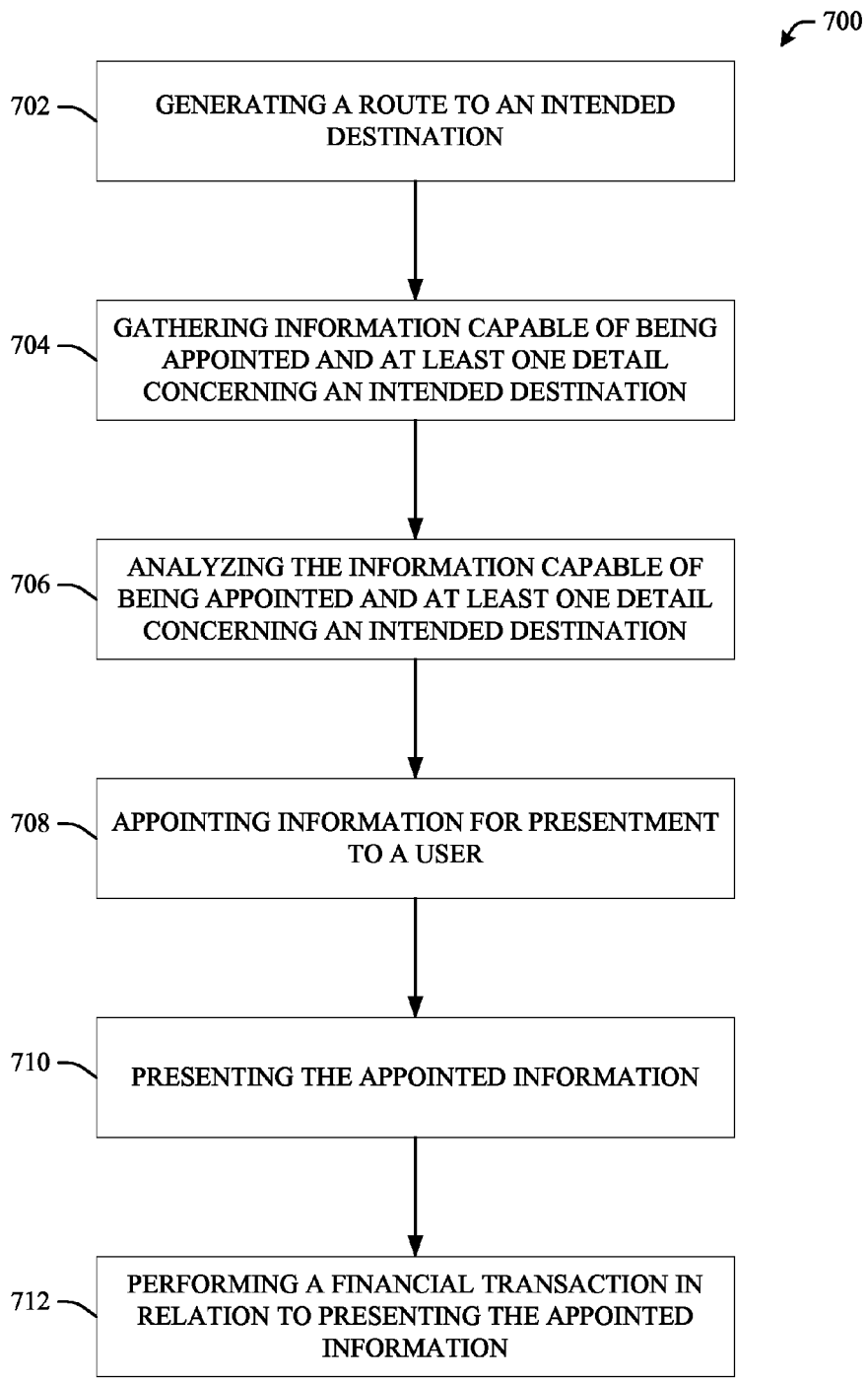
FIG. 7 illustrates a representative methodology for presenting a detail relevant to an intended destination in accordance with an aspect of the subject specification.

FIG. 7 discloses an example methodology 700 for presenting information to a user that relates to an intended destination. There is generating a route to an intended destination 702. A user can enter data, such as a starting point and an intended destination. Based upon the information, a route can be created for the user to take to reach the intended destination from the starting point. Specific constructs can be used for route generation, such as avoiding roads that require a toll. According to one embodiment, route generation takes place automatically by estimating an intended destination and determining a starting point from a global positioning system. From the estimated intended destination and determined starting point, a route prediction can take place upon where a user will travel.

At action 704, gathering information capable of being appointed and at least one detail concerning an intended destination takes place. Details concerning the destination that can be gathered include user location, route information, and contextual data. As part of gathering information, filtering can take place to determine if information is relevant and a subset of information is subjected to further processing.

There is analyzing the information capable of being appointed and at least one detail concerning an intended destination 706. For example, different pieces of information based upon a number of factors, such as profit for various parties, relevancy, contractual obligations, etc., are evaluated. The information pieces can be assigned mathematical numbers based upon results of the analysis.

Appointing information for presentment to a user 708 occurs, where appointed information relates to an intended destination of the user. Appointing information takes place through analysis of the gathered details—in one embodiment, pieces of information with a highest score is what is ultimately appointed. If multiple information portions are to be appointed, selection can take place through choosing information pieces with a highest score (e.g., pieces with highest about three scores), highest score in categories (e.g., highest scoring commercial detail and highest scoring piece of traffic information are both presented), etc.

Event 710 is presenting the appointed information. Commonly, presentment takes place through disclosure of a visual screen and/or through use of an audio transmitter. However, other embodiment can be practiced, such as applying ink to paper through a printer. The presentation can take place though multiple disclosure components (e.g., about fifteen different visual screens).

There is performing a financial transaction in relation to presenting the appointed information 712. A financial transaction allows funds to transfer between at least two parties. Depending on configuration parameters, different parties can receive and/or lose money based on the presentation. Example parameters include value of information, duration of information, benefits/detriments, etc. For instance, a provider can charge 'X' amount to provide one available parking location near the intended destination and 'Y' amount to provide more then one available parking location.

Figure 8:
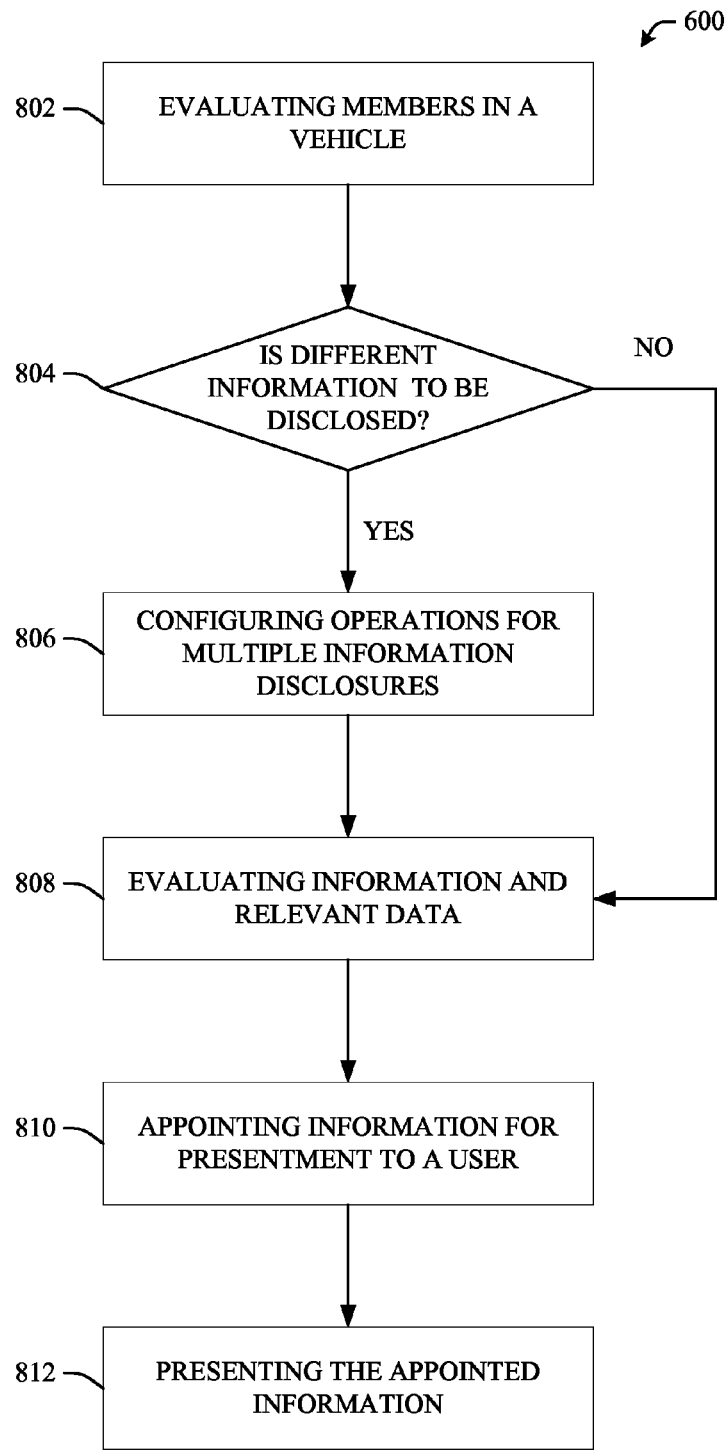
FIG. 8 illustrates a representative methodology for presenting different details relevant to an intended destination upon different areas in accordance with an aspect of the subject specification.

FIG. 8 discloses an example methodology 800 for providing different information upon at least two portions of a vehicle. Evaluation of vehicle members takes place at action 802 to ascertain characteristics of the members, physical condition of the members, etc. While traveling, a driver as well as a passenger can occupy a vehicle and different members can have varying interests and intended destination information. Action 802 can examine profiles and characteristics of users in determining content. For instance, a sensor on a vehicle seat can determine that a particular passenger is sweating. An inference can be made (e.g., though artificial intelligence techniques) that the passenger is hot and this information can be used to notify the passenger of an ice cream stand near an intended destination. A check 804 takes place to determine if different information is to be disclosed. For example, logic related to the methodology 800 can indicate that a personalized message should be disclosed for a passenger (e.g., similar content to vehicle members, but a personalized introduction is disclosed, such as reciting greeting and passenger name).

If there is to be different information disclosed, then there is configuring operations for multiple information disclosures at action 806. Configuration can include sending a power signal to a disclosure component and determining an appropriate disclosure medium. If a passenger is blind, then a disclosure component that presents video and sound can have video capabilities disabled through event 806.

There is evaluating information and relevant data at event 808 to gain a greater appreciation of a situation. Evaluation of information and relevant data allows for a determination on what information is to be presented is to be disclosed to different parties. Based upon the determinations, there can be appointing information for presentment to a user 810 occurs. Commonly appointment takes place in a similar manner as discussed in act 708 of FIG. 1. There is presenting the appointed information 812. Operation of action 812 can take place through practices contestant with details discussed relating to event 710.

Figure 9:
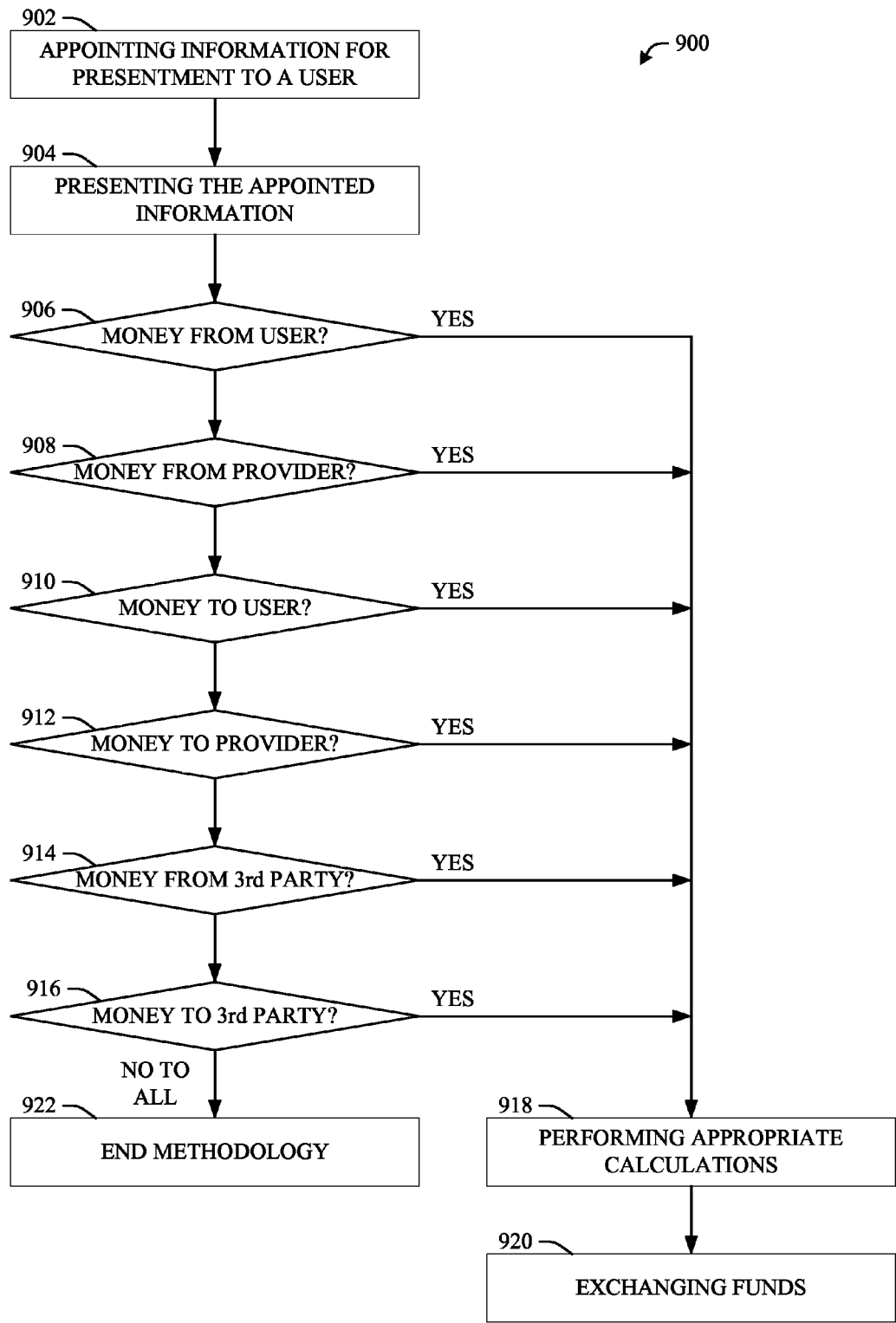
FIG. 9 illustrates a representative methodology for performing financial operations concerning presentation of a detail relevant to an intended destination in accordance with an aspect of the subject specification.

FIG. 9 discloses an example methodology 900 for performing financial calculations in conjunction with presenting information related to an intended destination. At action 902, there can be appointing information for presentment to a user at action, which designates the information for disclosure. Commonly appointment takes place in a similar manner as discussed in act 708 of FIG. 1. There is presenting the appointed information 904. Operation of action 904 can take place through practices contestant with details discussed relating to event 710.

A series of checks can take place to determine if a financial transaction is to occur. Checks can take place to take money from a user 906 or provider (e.g., an explicit provider, such as a company that discloses commercial details for an express purpose of being disclosed to a user) 908. In addition, checks 910 and 912 can enable money to transfer from the user or the provider respectively. In addition, a third party can have checks take place to give money 914 or receive money 916. For example, a car manufacturer that acts as a third party (e.g., not a user or explicit provider) can pay money to obtain information that can be disclosed to a driver or a driver can pay money to the manufacturer for information receipt.

If a 'yes' takes place on a check 906 to 916, then there is performing appropriate calculations 918. Example calculations include determining an amount to transfer, determining if a transfer will leave a party in default (e.g., if about $100 are to be transferred from a user account, but the account holds about $50, the user can be placed in default), etc. Based on calculation results, there is exchanging funds 920—removing money from a debit account, placing an order upon a credit card, generating a check through software and a printer, etc. Checks 906 to 916 can take place in parallel, in sequence, etc. and commonly operate independently. For instance, if check 908 answers in a 'yes' or 'no', check 910 can still take place. If there are 'no' designations on checks 906 to 916, then the methodology ends 922.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
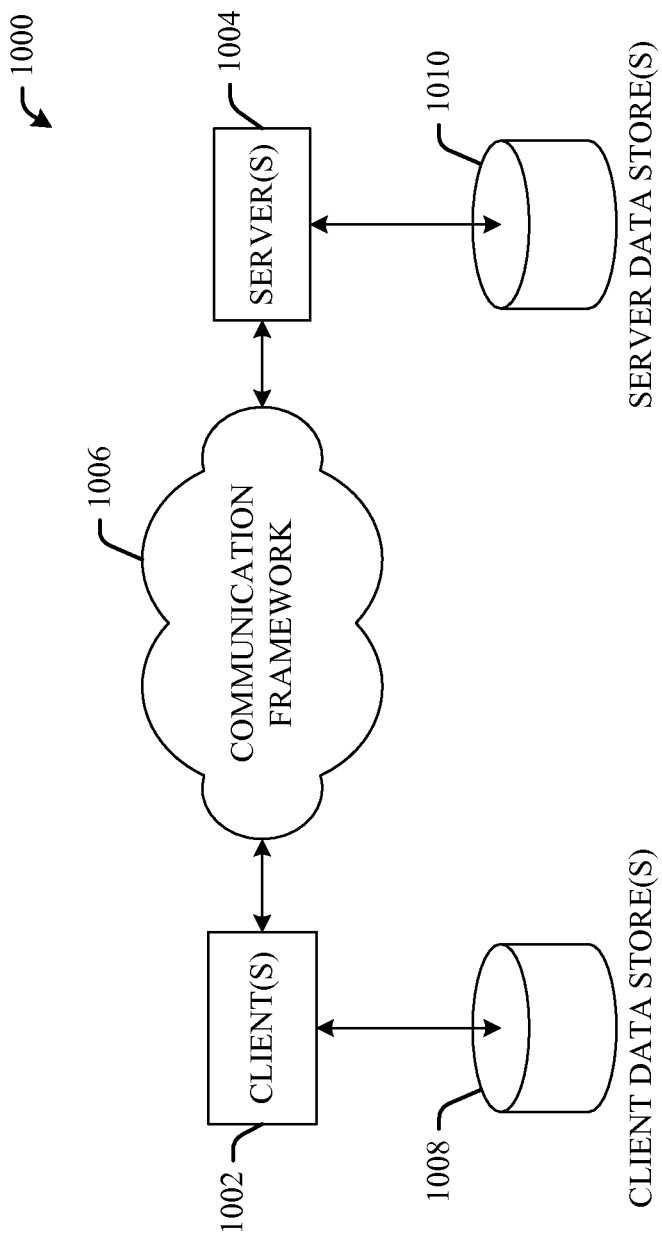
FIG. 10 illustrates an example of a schematic block diagram of a computing environment in accordance with the subject specification.
Figure 11:
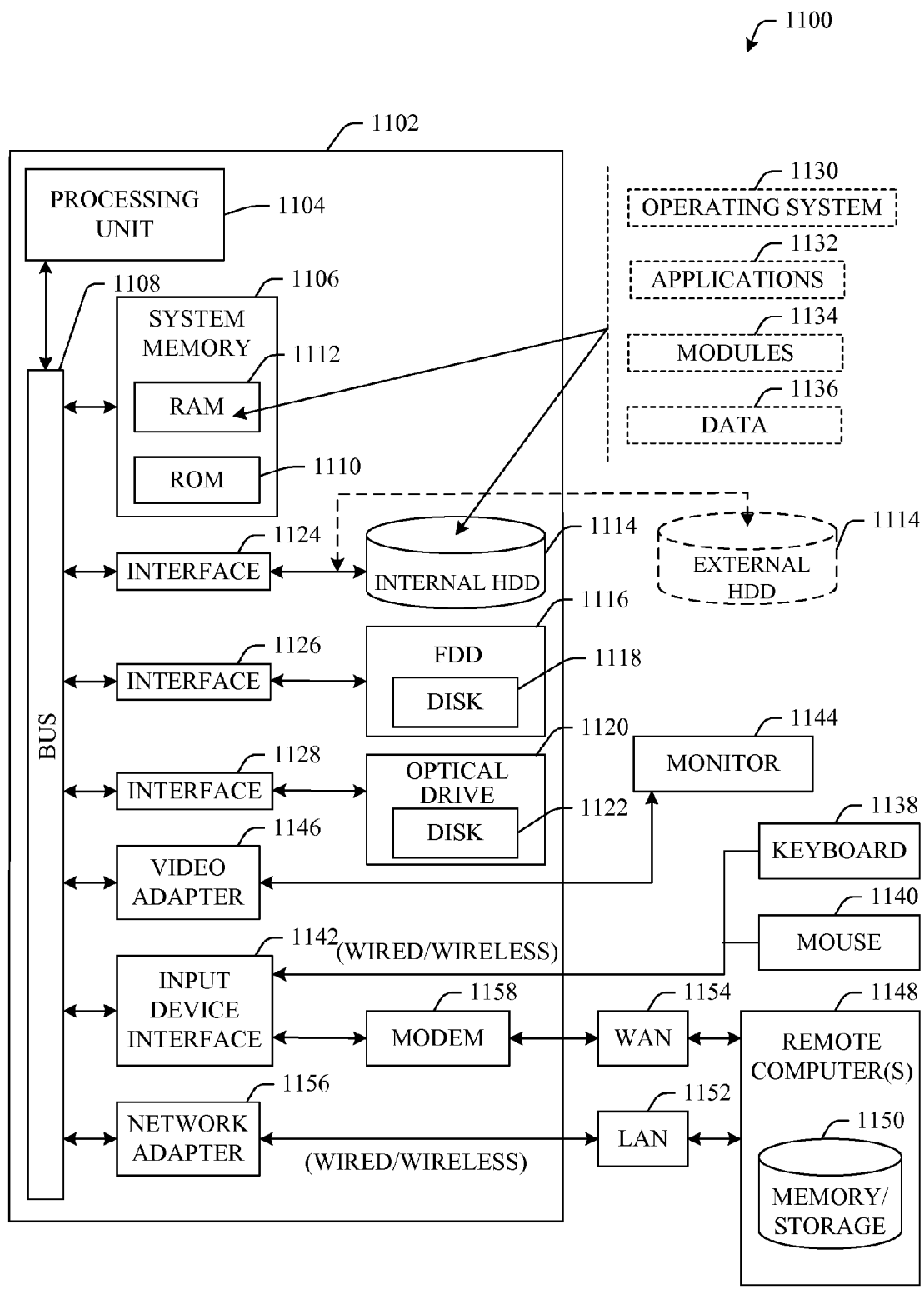
FIG. 11 illustrates an example of a block diagram of a computer operable to execute the disclosed architecture.

In order to provide a context for the various aspects of the disclosed subject matter, FIGS. 10 and 11 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising a processor coupled to a computer storage medium, the computer storage medium having stored thereon a plurality of computer software components executable by the processor, the system comprising:

a central server that tracks implementations of the system to make an inference;

a gather component that collects route information, a user location, and contextual data, uses the inference to filter out requests, instruct monetization suggestions, and influence operation of the system, and receives duration information for a red light at a particular intersection; and a selection component that chooses a commercial detail associated with an intended location to present to a user that is based upon the duration information and the collected route information, the collected user location, the collected contextual data, or a combination thereof.

2. The system of claim 1, further comprising a disclosure component that presents the chosen detail to the user.

3. The system of claim 2, wherein the disclosure component presents two details chosen by the selection component, wherein a first detail is presented on a first portion of the disclosure component and a subsequent detail is presented on a subsequent portion of the disclosure component.

4. The system of claim 1, further comprising a compensation component that provides a reward in relation to the presentment of the chosen detail to the user.

5. The system of claim 1, further comprising an artificial intelligence component that makes at least one inference or at least one determination in relation to the detail choice.

6. The system of claim 1, further comprising a generation component that constructs a route to an intended destination.

7. The system of claim 1, wherein the selection component chooses the detail based upon a financial consideration, the intended location is a location that is to be traveled to by use of a vehicle, the intended location is an intended destination, the gather component obtains balance information as the contextual data, the gather component implements upon the vehicle, the selection component implement upon the vehicle, or a combination thereof.

8. The system of claim 1, further comprising a summary component that constructs a profile of at least one creature, wherein the collected contextual data includes the profile.

9. A method, comprising:
storing computer useable instructions on computer storage media;
executing the computer useable instructions by one or more computing devices, causing the one or more computing devices to:
(1) examine profiles and characteristics of users in at least two portions of a vehicle having varying interests and intended destination information;
(2) evaluate information and relevant data for a determination on what information is to be disclosed to each user in the at least two portions of the vehicle;
(3) based on the determination, appoint information for presentment to each user; and
(3) present the appointed information that relates to the intended destination and the characteristics of each user.

10. The method of claim 9, wherein executing the computer useable instructions by the one or more computing devices further causes the one or more computing devices to gather information capable of being appointed and at least one detail concerning the intended destination, wherein the appointed information takes place through analysis of the at least one detail.

11. The method of claim 9, wherein the appointed information is a commercial detail.

12. The method of claim 9, wherein the appointed information for presentment to each user is based upon a received compensation.

13. The method of claim 9, wherein executing the computer useable instructions by the one or more computing devices further causes the one or more computing devices to perform a financial transaction in relation to the presented appointed information.

14. The method of claim 9, wherein executing the computer useable instructions by the one or more computing devices further causes the one or more computing devices to generate a route to the intended destination.

* * * * *